March 21, 1939.     C. H. JOHANSON     2,150,894
VARIABLE-ZONE LEATHER STRETCHING MACHINE
Filed July 2, 1937
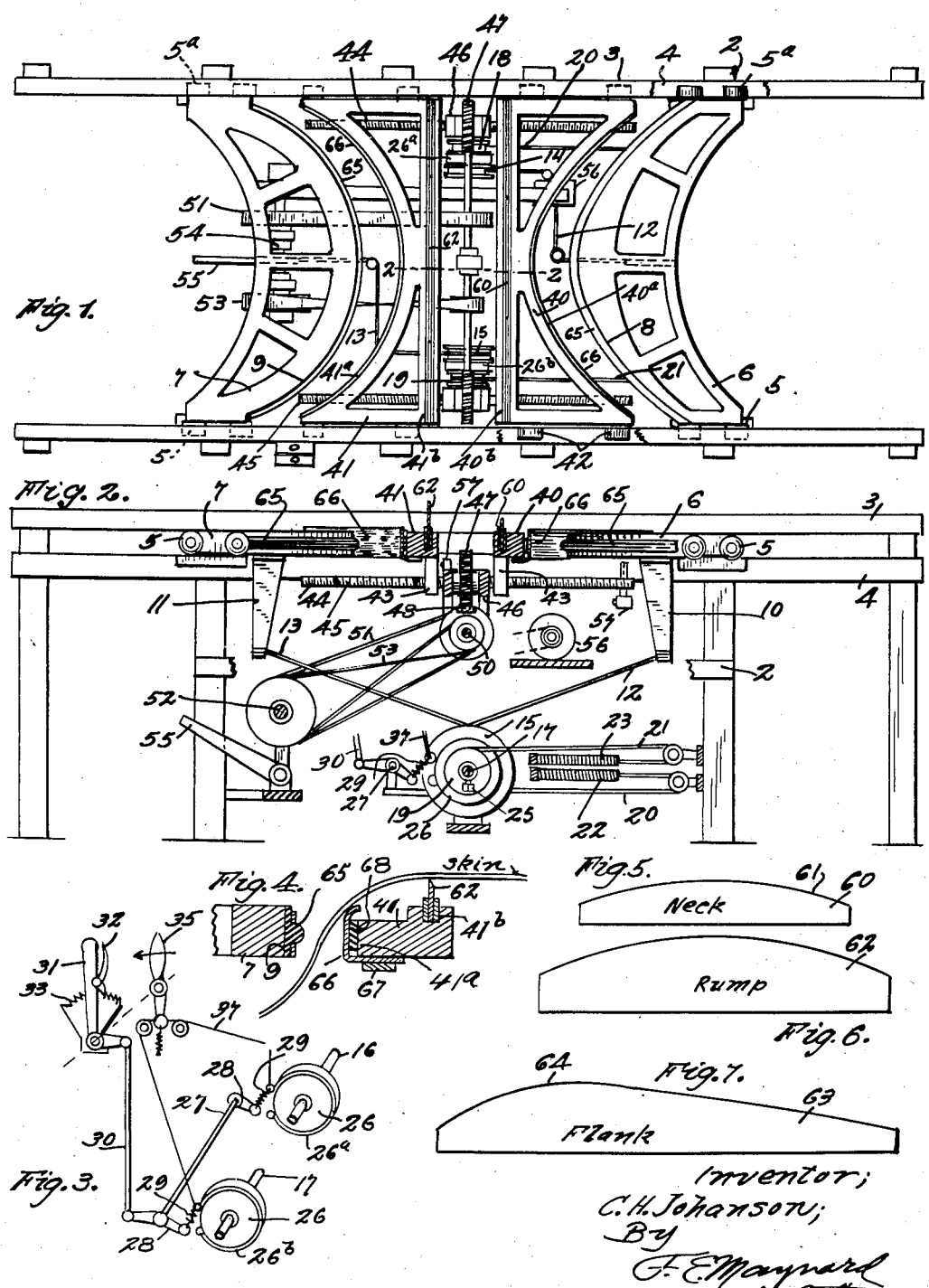

Patented Mar. 21, 1939

2,150,894

UNITED STATES PATENT OFFICE 2,150,894

VARIABLE-ZONE LEATHER STRETCHING MACHINE

Carl Hugo Johanson, Los Angeles, Calif., assignor to Olivia S. Johanson, Los Angeles, Calif.

Application July 2, 1937, Serial No. 151,707

23 Claims. (Cl. 149—21)

My present invention is a machine and method for most advantageously subjecting certain kinds of sheet material, particularly leather, to stretching operations commonly performed by hand in the glove industry.

The invention is an improvement in the machine art for this purpose as discovered in my U. S. patent applications as follows: No. 96,415, filed August 17, 1936, and No. 115,706, filed December 14, 1936.

In the stretching of skins for the cutting of glove blanks therefrom it is necessary that practically the whole area be so pulled in one general direction that there will be evenly distributed throughout the skin a uniform degree of latent stretch which is called, in the trade, "leather", and which is contained in the skin on lines transverse to the final direction of conditioning stretch given the leather.

Because of well known, inherent thickness variations in the commercial skins utilized in the glove trade and well known differences in the potential stretch of different zones of a given skin the preparation of the skin by stretching has been for a very long period of time confined to highly skilful manual labor, at high cost of time and expense.

An object of this invention is primarily to provide a machine for the practice of accomplishing the effective stretching of a given skin in a manner equalling or bettering hand stretching, and whereby to effect the special tensioning of the skin both longitudinally and transversely to equalize the potential "leather" stretch in the ultimate glove blank.

A further object is to provide readily interchangeable and relatively adjustable means for controlling the degree of tension at particular zones while the full length or width is tensioned.

The invention consists in certain advancements in the leather or other sheet stretch art as set forth in the ensuing disclosure and having, with the above, additional objects and advantages as hereinafter developed, and whose construction, combination and details of means, and the method and manner of operation will be made manifest in the description of the annexed illustrated apparatus or embodiment; it being understood that modifications, variations and adaptations may be resorted to within the spirit, principle and scope of the invention as it is more directly claimed in the appendage.

Figure 1 is a plan of the machine showing the gripping means in open position.

Figure 2 is an elevational, vertical section longitudinally of the machine; the inner slides being sectioned on line 2—2 of Fig. 1.

Figure 3 is a diagrammatic perspective of grip and release control means.

Figure 4 is a detail cross-section of coacting, gripping faces of relative inner and outer slide and carriage parts.

Figure 5 is a side elevation of a neck-end skin arching plate, Figure 6 is a like side view of a rump end arching plate, and Figure 7 is a similar view of an arching plate for use in laterally stretching a skin as to its length from neck to rump.

The machine includes a suitable frame 2 having side, top pairs of longitudinal, upper and lower rails 3—4 vertically spaced to receive pairs of free running wheels 5—5ª which are provided at opposite ends of outer, transverse pressure applying or gripping slides 6 and 7 which lie horizontally between the track rails for longitudinal movement thereon. These slides have bowed, inner faces 8 and 9; that of the slide 6 here being shown as of more pointed plan than slide 7. This is for the reason that a skin to be stretched lengthwise is placed with its neck end adjacent to the more pointed slide 6 and its rump end at the more gradually curved slide 7.

These outer slides 6—7 have respective downwardly directed, centrally located brackets 10 and 11 from which lead inwardly draft cables 12 and 13 attaching to respective drums 14 and 15 fixed on alined respective axles 16 and 17, Fig. 3, suitably supported in the frame 2. Fixed to these axles are respective pulleys 18 and 19 to which are attached tension cables 20—21 which are kept under desired tension by their anchored springs 22—23, Fig. 2. The purpose of this mechanism is to provide automatic, inward movement of the outer slides 6—7; to allow for manual outpull of the slides, when free, and to provide means whereby a variable degree of gripping pressure on a skin may be had when the slides are gripping a skin.

Each pulley has a set screw 25 whereby to set its pulley on its axle when the tension desired on the spring controlled cables 20—21 has been regulated. While the slides 6—7 will move inwardly automatically, if free, it is desired to provide for controlling the outward movement of the gripping slides; to control gripping pressure on a skin to be stretched. For this purpose a brake drum 26 is fixed on each axle 16—17 and each has a band as 26ª—26ᵇ and a rock shaft 27 has an arm 28 at each end connected by stout springs 29 to free ends of the brake bands. The shaft 27 has link connection 30 to a brake lever 31 having a latch 32 designed to lock on a segment 33 to hold the bands set at a desired pressure and to thus control the degree of resistance to outward movement of the slides and to hold the slides against inward movement by their cable springs 22—23 unless the brakes are loosened either by the hand lever 31, or otherwise as will now be described.

It may be desirable, during skin stretching, to release one brake while the other remains set. This is to obtain a reduction of gripping pressure of one slide or the other at will. Therefore, a release lever 35, coaxial with lever 31, is suitably connected with the brake means so that by pulling the lever 35 one way will loosen one brake, and pushing it the other way will loosen the other brake; in either case without affecting the setting of the brake lever 31 so that this preserves its adjusted action on the un-released brake, and so that the desired brake pressure is instantly available when the releasing lever is brought to neutral again. A simple means for such selective brake release here includes a cable 37 connected to the lever 35 and guided and connected to the ends of the brake bands 26ᵃ—26ᵇ at the springs 29 in such manner that when the releasing lever 35 is pulled the band 26ᵇ will be slacked from its setting spring 29, Fig. 3, and if the lever 35 is pushed the other way the band 26ᵃ will be slacked.

When either band is released by the lever 35 the relative slide 6 or 7 is free to move in under its tension spring effort or may be pulled outward by hand to open position for introduction of a skin, Fig. 4. Both slides 6—7 may be released by unlocking the hand lever 31 of the brake system so that the two slides may be moved outward to the position shown in Fig. 1.

There is arranged between the slides 6 and 7 a pair of generally flat, frames or carriages 40 and 41, each having pairs of wheels 42 at its ends to run on and between the side tracks 3—4 and move in the same plane as the slides. The carriage 40 has an outer, side face 40ᵃ curved, in plan, to match the near face 8 of the slide 6 with which it cooperates to grip, say the neck end of a skin dropped in between the open carriage and slide, while the two carriages are in innermost position on the tracks.

The carriage 41 has an outer face 41ᵃ complementary to the relative rump slide 7 to grip the inserted rump end of a skin.

Power means are provided for the concurrent quick inward movement, and also the slow outward or stretching movement of the carriages. For this purpose each carriage has near its track ends nut devices 43 which respectively engage with parallel, longitudinal shaft screws 44—45 each with right and left hand threaded portions to effect the concurrent movement of the carriages in opposite directions. The screws are supported in suitable bearings 46 and have gear wheels 47 driven by spiral gears 48 which are fixed on a cross-shaft 50 having a straight belt drive 51 from counter-shaft 52, and a reverse belt 53 also connects shafts 50—52. A suitable direct and reverse control clutch 54 having a shift lever 55 is provided to control direction of drive of the gear shaft 50.

The counter-shaft 52 is preferably driven by a suitably mounted electric motor 56 and suitable means is provided to automatically prevent overrun of the carriages in either direction and here includes suitable circuit breaking switches 57 disposed in extreme positions of relative carriages so as to be actuated thereby in event that the operator does not properly time his operation of the control lever 55.

A feature of the invention resides in a system of selective elements adapted to be readily applied to and adjustably arranged on the carriages 40—41 and having the function of causing increased tension to be set up in a given area of the skin being stretched. While the skin is being stretched from neck to rump it is desirable to have greater tension along the stiff or thick axial portion than at the softer flanks. This is accomplished by insertion of vertical, stiff breaker plates in transverse slot 40ᵇ in the top of the inner margins of the carriage 40, and in a like slot 41ᵇ of the carriage 41. Thus, a plate 60, Fig. 5, is shown as having a longitudinally convexly arched, crowned or bowed top edge 61 and is adjustable into the said slot 40ᵇ in the neck carriage 40. Fig. 6 shows a longer and higher plate 62 for application to the rump slide 41. It is understood that the operator will choose plates 60—62 having a size commensurate with the size of the skin to be stretched.

Fig. 7, shows a type of arch-plate 63 of which a corresponding pair will be inserted in the slots 40ᵇ—41ᵇ of the carriages when the skin is to be stretched cross-wise from flank to flank. The plate 63 has its high point 64 near one end and this is inserted in the carriage at the rump end of the skin, which latter in this stretch lies along the carriages, that is, parallel to the slots 40ᵇ—41ᵇ, and to the applied plates 63.

In Fig. 4, there is shown a rubber gripping strip 65 suitably fixed to the convex side face 9 of the slide 7. The opposing concave face of the carriage 41 is covered with a smooth face fabric 66 or other suitable material held by a bottom clamp 67. It is understood that the slide 6 and its carriage 40 are likewise equipped. The facing strip 66 is preferably bedded on an interposed rubber cushion 68.

When a skin is to be stretched suitable archplates 61—62 are centrally adjusted in the slots of the carriages 40—41 and these are driven toward the center of the machine. The brakes are released and the release lever 35 left in neutral or free position. The slides 6—7 are opened to position shown in Fig. 1 so that the neck of the skin can be dropped in between slide 6 and carriage 40, and the rump end dropped in between slide 7 and its carriage 41. The slides are now pushed in to gripping position by hand; the tension cables 20—21 being slack. The brakes are now set to desired pressure to retard outward movement of the gripping slides, and if the motor is running the clutch lever 55 is thrown in such direction as will effect the rotation of the drive screws 44—45 to force the carriages outward while the slides grip the skin with a pressure determined by the brake resistance. The skin remains about stationary while the stretching carriages and slides move outward, and the greater the gripping pressure is the more the skin will be stretched. If for any reason one end is gripped too tightly, it can be instantly released by movement of the release lever 35 to ease up on the relative brake band. After desired degree of stretch has been given a skin the clutch lever 55 is shifted to reverse the drive of the carriages and as these near the central position the slides 6—7 are released from brake action and will rest in open position and release the stretched skin. The slides are drawn inward with the carriages by tension cables and springs 22—23.

What is claimed is:

1. Sheet stretching apparatus including a set of coplanar slides, carriages arranged between and for moving the slides concurrently from each other and movable inwardly free thereof, elongate gripping means on the slides closeable against the carriages to frictionally grip interposed portions of the sheet substantially from edge to edge thereof, and means on the carriages presenting longitudinally arched or crowned edges for engaging and arching the sheet transversely to the lines of tension to apply local tension to certain portions thereof during the operation of stretching.

2. In a sheet stretching machine, substantially parallel gripping means including a pair of carriages and coordinate slides movable apart by the carriages to clamp on the sheet from edge to edge along spaced lines, means to relatively shift the gripping means while closed for sheet tensioning, and a provision on the carriages for subjecting the sheet to a localized transversely elongate arching effect to apply local higher tension to certain portions of the sheet.

3. In a sheet stretching machine, a pair of coplanar carriages and independently movable slides opposed to distal sides thereof to grip the interposed sheet along spaced, continuous lines from edge to edge, means to actuate the carriages and their closed slides in gripping position for generally tensioning the sheet intervening therebetween, and said carriages having a provision for subjecting a localized portion of the sheet to a bowing or arching effect for additional tensioning concurrently with the general tensioning action.

4. In a sheet stretching machine, means to grip the sheet along spaced lines and including a bodily shiftable assembly to clamp the sheet and to stretch it, and a device mounted in the assembly and having a longitudinally elongate crowned edge to engage the tensioned sheet and for applying additional local tension to the zone affected by the crown.

5. In a sheet stretching machine, means for gripping along spaced lines and generally tensioning an interposed sheet and including a device for slidably clamping the sheet, and supplemental means carried by the device to engage and arch the sheet as it slides from the gripping device for concurrently increasing local tension along a given zone of the generally tensioned sheet, said supplemental means including plates having longitudinally convexed, bench edges disposed in offset relation to the plane of the sheet between the stretching means.

6. In a machine for generally unidirectionally stretching a sheet between two spaced lines extending from edge to edge of the sheet, a pair of relatively separable devices each with means to slidably clamp the sheet, and means carried by said devices to locally engage the tensioned sheet and increase tension at the thus localized zone as the sheet slides between the relative clamping device.

7. In a sheet stretching machine, means including carriage and slide parts for slidably and cooperatively gripping and generally stretching an interposed sheet, and a device mounted on one of said parts and presenting a portion with a longitudinally convexed edge between and transverse to the lines of grip for local engagement of a certain portion of the sheet to locally increase tension in a zone determined by said engagement as the sheet slides on its relative part of the gripping means.

8. A sheet stretching machine having, in combination, means for gripping the sheet along spaced lines from one edge to the opposite edge and generally tensioning the sheet in one direction and including opposite mechanisms slidably gripping the sheet, and having, in each said mechanism, means acting concurrently to subject a given area of the sheet to an out-of-stretch plane bowing localized, additional tension, and means for relatively separating said mechanisms to stretch the sheet with or without slip.

9. In a sheet stretching machine, means for gripping and unidirectionally stretching an interposed sheet and including a pair of carriages movable in a common plane and pressure slides movable in the same plane toward and from coordinate distal edges of the carriages to slidably grip a sheet draped over the carriages; said carriages being operable to outwardly repress the slides while pressing the sheet to said edges, and bow-edged means to transversely arch and further tension, given portions of the sheet out of its stretch plane between said distal edges.

10. In a sheet stretching machine, means including spaced relatively movable devices each including cooperative parts to slidably grip and unidirectionally stretch the sheet in lines transverse to opposite edges, and means mounted on respective parts of said devices engageable with a given portion of the sheet while it is under tension and whereby, upon relative sliding movement of the sheet and either of the gripping devices, a zone of the sheet determined by said engagement is bowed out of its stretch plane, across the line of stretch, to increased tension.

11. In a sheet stretching machine, means including a pair of cooperative elements to close on and slidably grip a sheet along a continuous line from one edge to an opposite edge for unidirectionally stretching the interposed sheet in a plane, and a part mounted on one of said elements having a longitudinally crowned edge over which the tensioned sheet is pressed and shifted to apply localized increase of tension as the sheet slides between the gripping elements, said portion arranged so as to bow the sheet out of the plane of stretch.

12. A machine as set forth in claim 11, and in which said part is detachably mounted for substitution and its edge is crowned according to the zone of the sheet to be locally super-tensioned.

13. A sheet stretching machine having a pair of carriages and means for concurrently shifting them in either direction, slides cooperating with the carriages to grip interposed portions of a sheet to be stretched and which are moved outwardly by the carriages during stretching action, and adjustable brake means for resisting outward movement of the slides and thereby regulating the gripping pressure on the skin.

14. A machine as set forth in claim 13 and including means for reducing brake pressure controlling the slides.

15. A machine as set forth in claim 13 and including means to automatically inwardly retract the slides when the carriages are inwardly retracted.

16. A sheet stretching machine having a pair of carriages, means for concurrently moving the carriages in either direction, slides movable outwardly by engagement with respective carriages, means for automatically inwardly retracting the slides as the carriages move inwardly, and brake means for resisting outward movement of the carriages; said slides and carriages having skin gripping coaction.

17. A machine as set forth in claim 16, and having supplemental brake releasing means.

18. A machine as set forth in claim 16, and having supplemental brake controls for selectively releasing either of the slides from brake action.

19. A sheet stretching machine having a pair of carriages having supporting devices for a skin to be stretched, a pair of slides movable toward and from the distal edges of the carriages and having gripping devices opposed to the said supporting devices to slidably grip interposed portions of a skin draped on said supports from carriage to carriage, said slides being pushed apart by and with the carriages to stretch the sheet, means for holding the slides in gripping position against the carriages with variable pressure, and a drive mechanism for moving the carriages apart together with the closed and gripping slides to stretch the gripped skin and for moving the carriages inwardly relative to the slides to release the sheet.

20. In a skin stretching machine, a pair of cooperative elements to slidably grip the skin along a continuous line between opposite edges of the skin, and a member detachably mounted on one of said elements and adapted for longitudinal adjustment thereon as to the line of skin grip and being provided with an edge to engage the skin and over which the skin is slidable as it slides from the gripping means and said edge being longitudinally crowned or arched with a curved contour determined by the zone of the skin under which said member is to be adjusted.

21. A skin stretching machine having, in combination, a pair of coplanar, opposite, relatively movable members whose distal edges are adapted to slidably support a skin draped thereover from member to member, and presser elements movably mounted outward of adjacent distal edges of the members; said presser elements being outwardly repressible by the said members while a skin is gripped on said edges by said presser elements and which presser elements are adapted for movement inwardly or outwardly in the same direction as the said members, and the said members being inwardly contractive independently of the outwardly repressed elements to release the stretched skin and provide for the draping of another over the said distal edges of said members.

22. A machine as in claim 21, and grip control resistors for reaction against outward movement of the presser elements by the actuating members.

23. A skin stretching machine having, in combination, a pair of opposite relatively movable members having distal edges to slidably support a draped skin extending from one member to the other, means for concurrently shifting said members in either direction, and presser elements movably mounted outwardly of said edges and shiftable into gripping contact with the draped skin and being repressible by outward movement of the members to stretch the skin; said members being contractive independently of the presser members.

CARL HUGO JOHANSON.